United States Patent [19]
Rudolph

[11] 3,820,411
[45] June 28, 1974

[54] IN-LINE, POSITIVE DRIVE, INDEXING UNIT

[76] Inventor: Rome R. Rudolph, 4113 Lee Rd., Gibsonia, Pa. 15044

[22] Filed: Apr. 5, 1973

[21] Appl. No.: 348,105

Related U.S. Application Data
[63] Continuation-in-part of Ser. No. 224,753, Feb. 9, 1972, abandoned.

[52] U.S. Cl. .................................................. 74/394
[51] Int. Cl. ............................................. F16h 35/02
[58] Field of Search ...................................... 74/394

[56] References Cited
UNITED STATES PATENTS

| | | | |
|---|---|---|---|
| 2,861,672 | 11/1958 | Buhrer et al. | 74/394 UX |
| 3,127,777 | 4/1964 | Pietsch | 74/394 X |
| 3,364,770 | 1/1968 | Button et al. | 74/394 |
| 3,507,162 | 4/1970 | Nomura et al. | 74/394 |

*Primary Examiner*—Leonard H. Gerin
*Attorney, Agent, or Firm*—Brown, Murray, Flick & Peckham

[57] ABSTRACT

An indexing unit having coaxial input and output shafts arranged for individual rotation about a common first axis. The shafts are connected by a positive drive train which includes output gear means rotatable with the output shaft; and planetary gear means supported by the input shaft for revolution therewith about the common first axis and in meshing relation with the output gear means. Dwell means is provided for maintaining the output shaft stationary during a selected arc segment of revolution of the input shaft. Indexing means is provided for rotating the output shaft through a selected indexing angle during the remaining arc segment of revolution of the input shaft. The indexing means provides controlled acceleration and deceleration of the output shaft during the initial and end portions of the indexing period.

16 Claims, 28 Drawing Figures

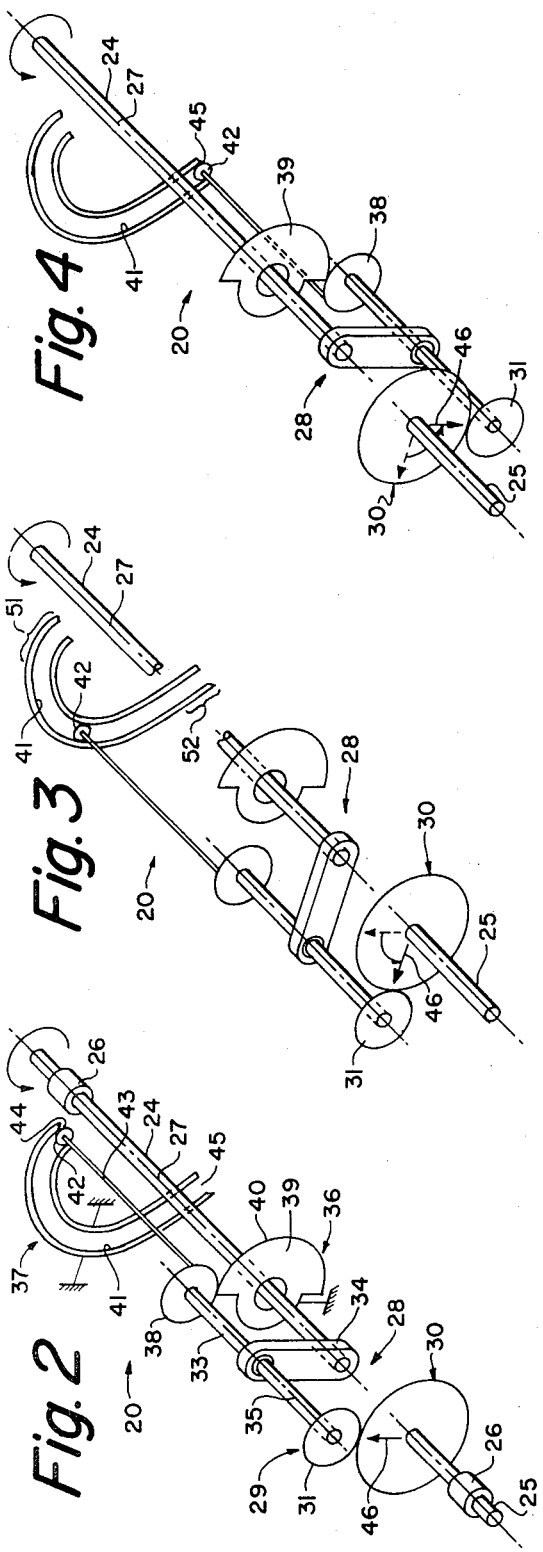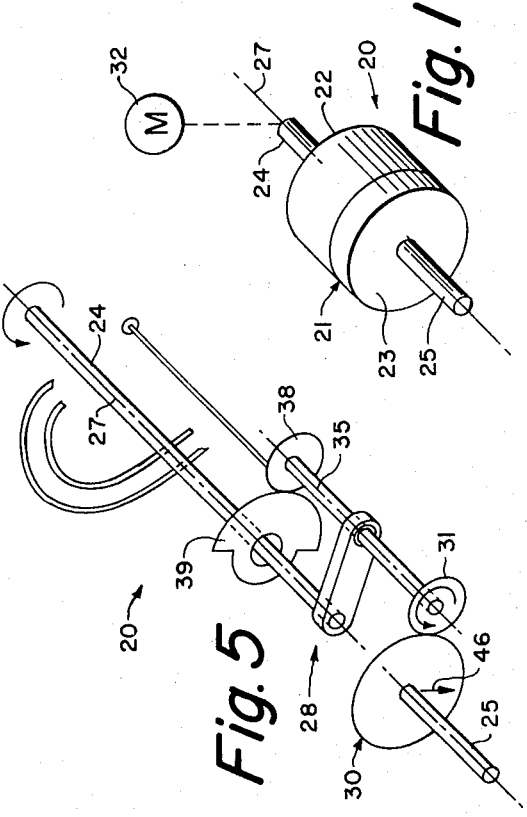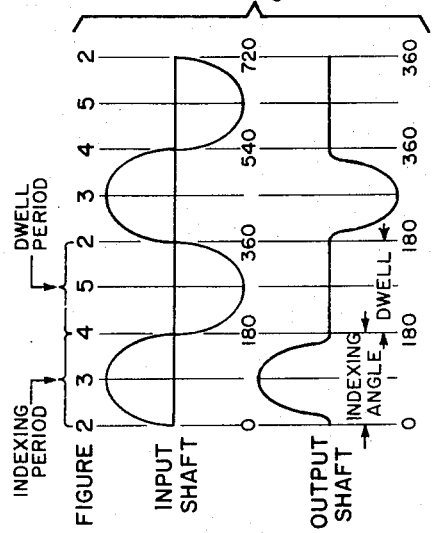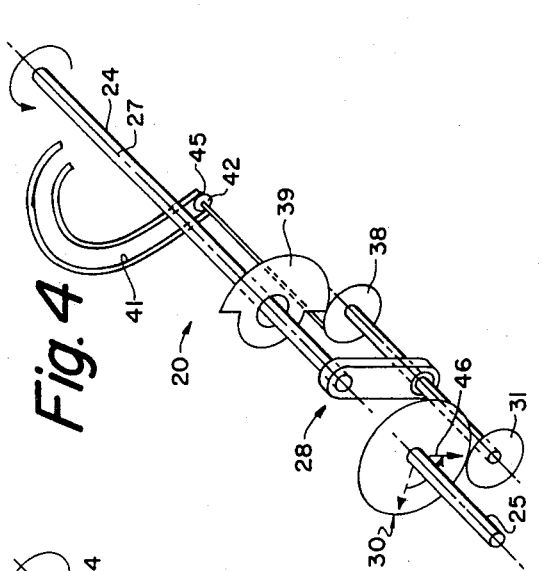

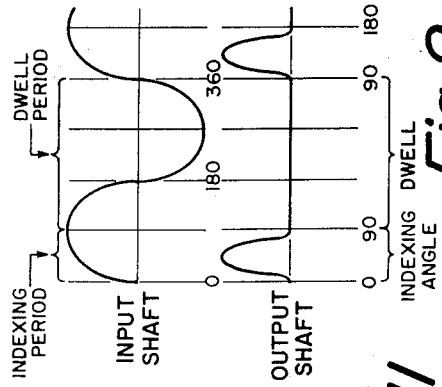
Fig. 9
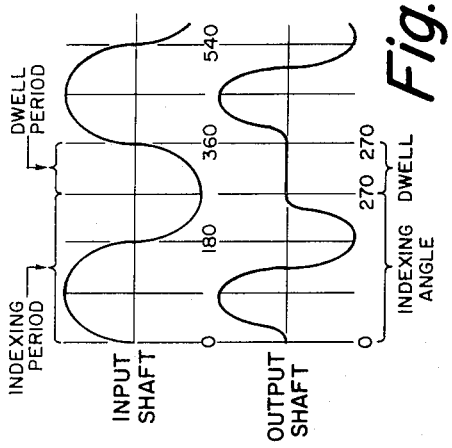
Fig. 11
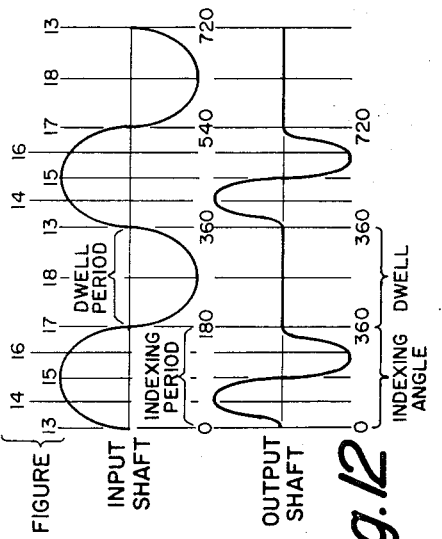
Fig. 12
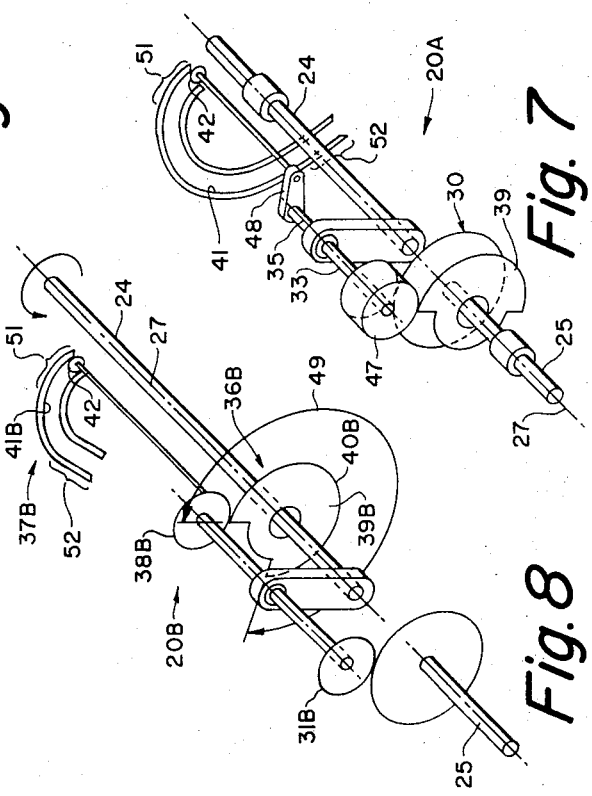
Fig. 7
Fig. 8
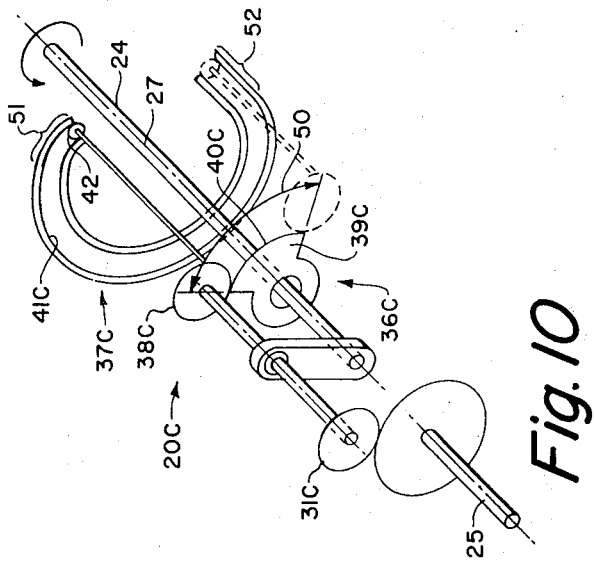
Fig. 10

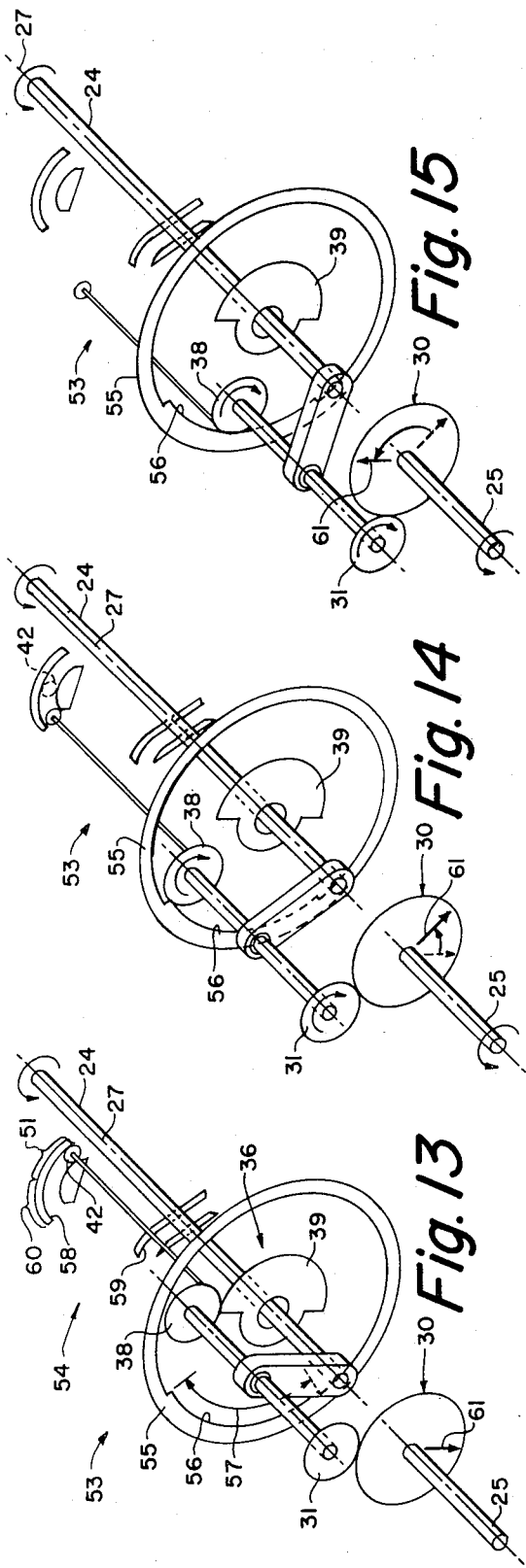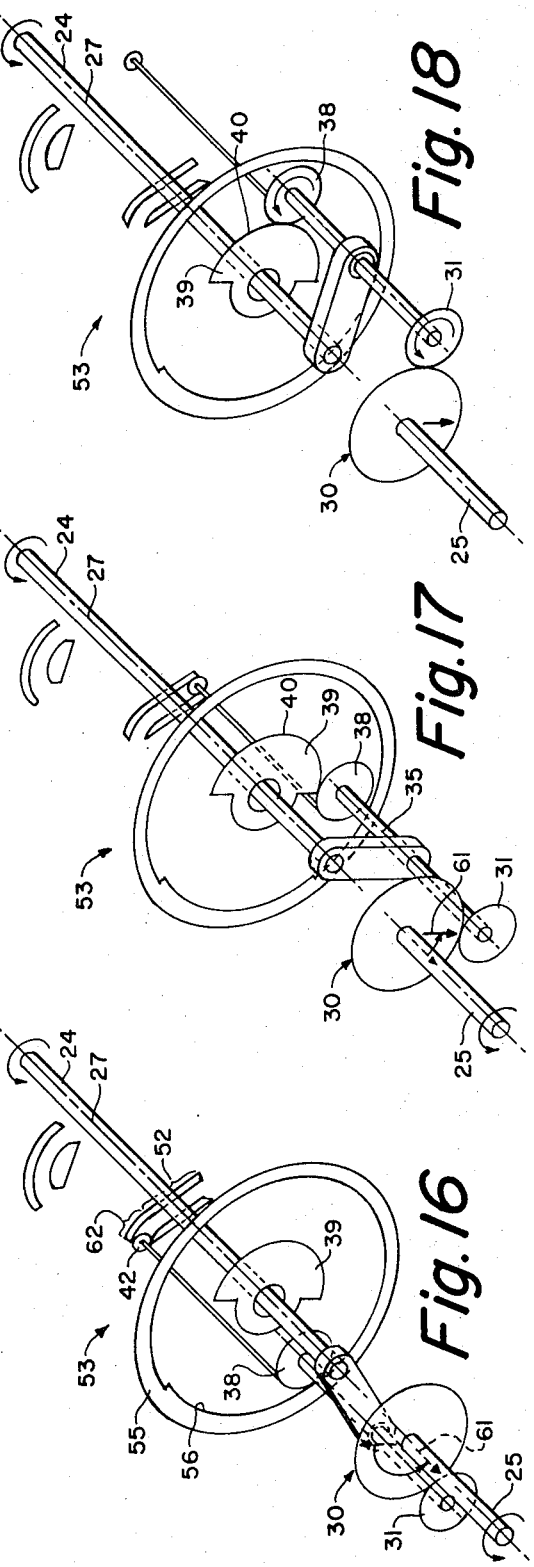

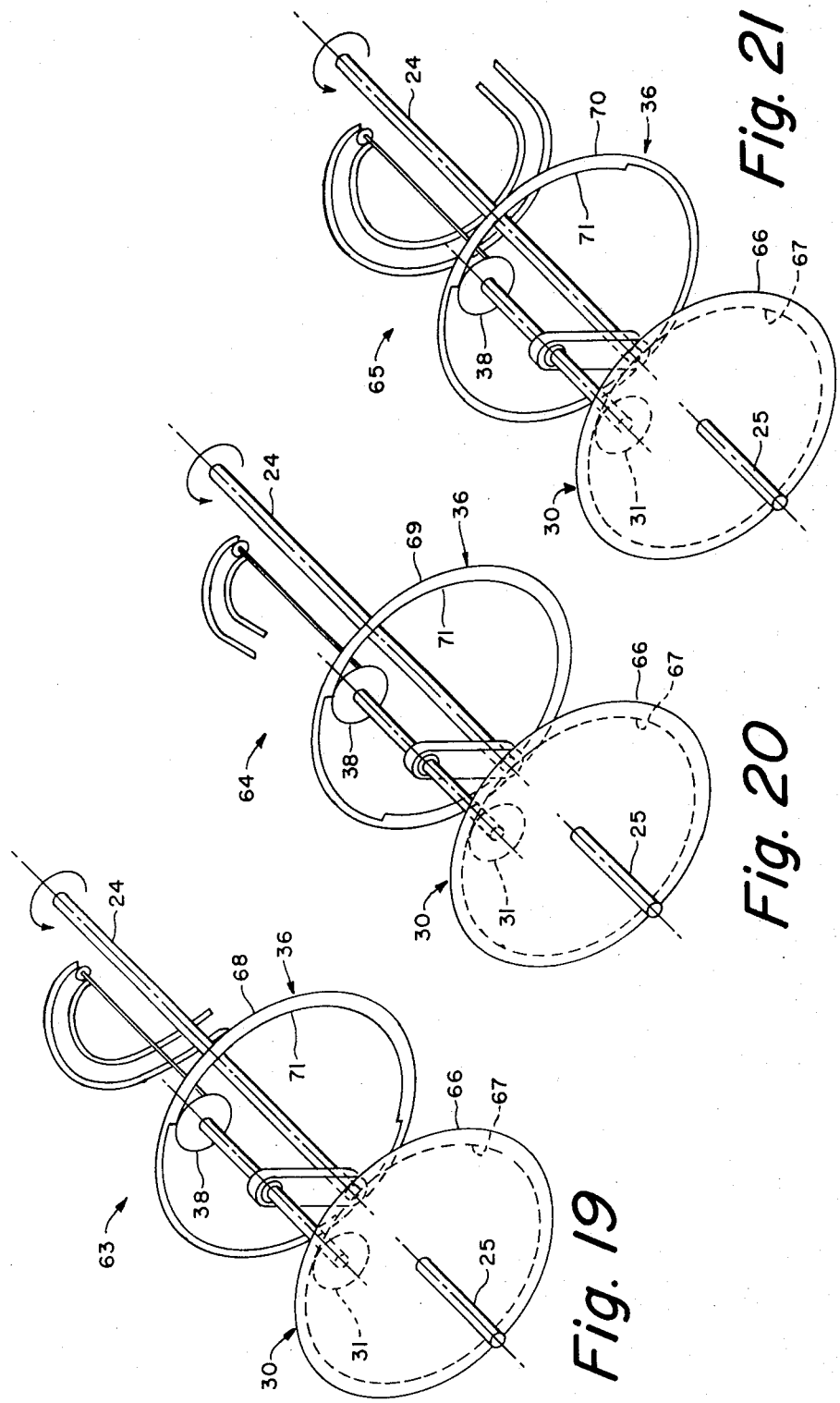

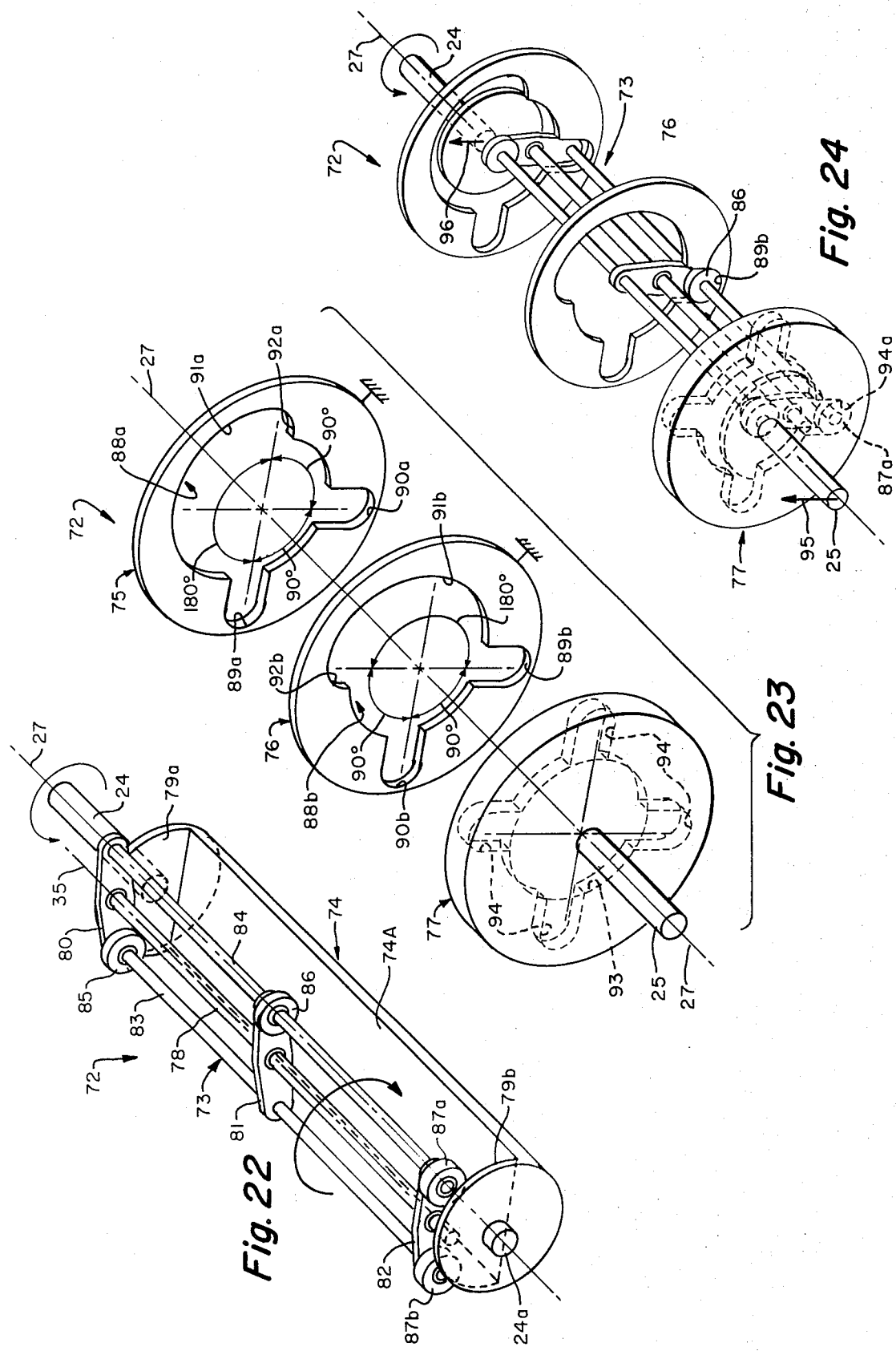

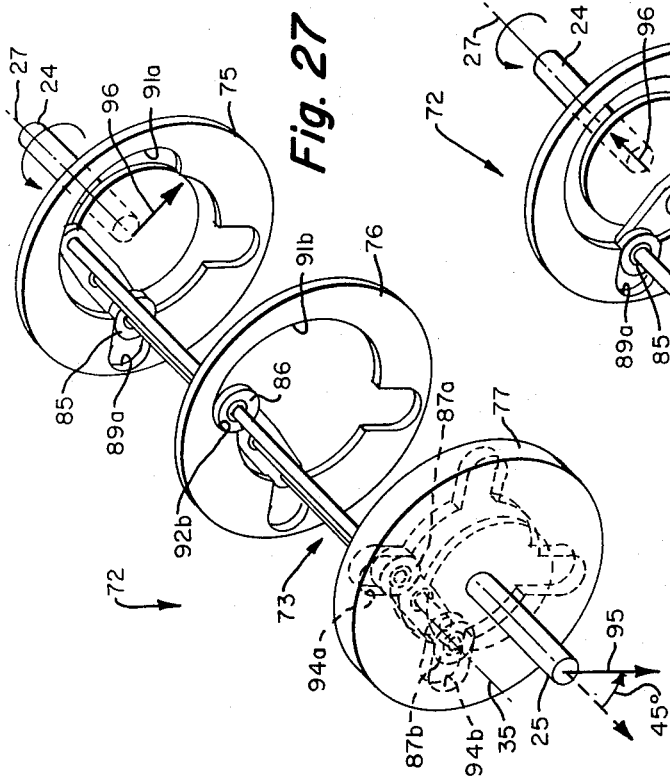
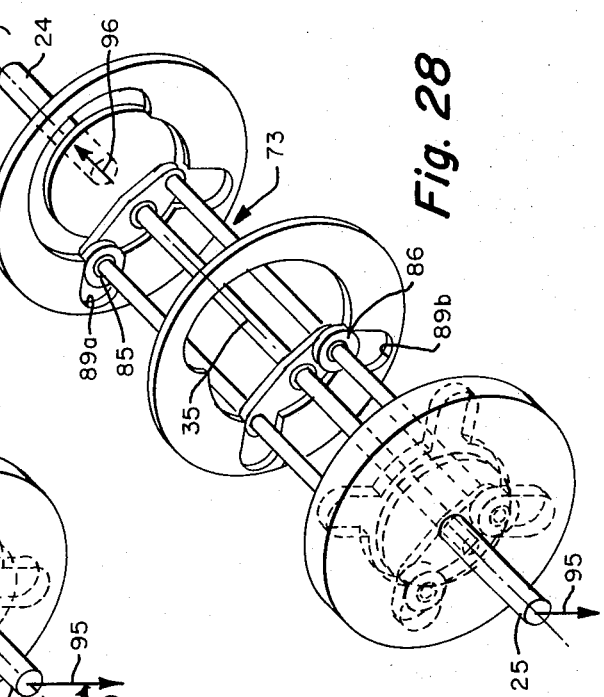
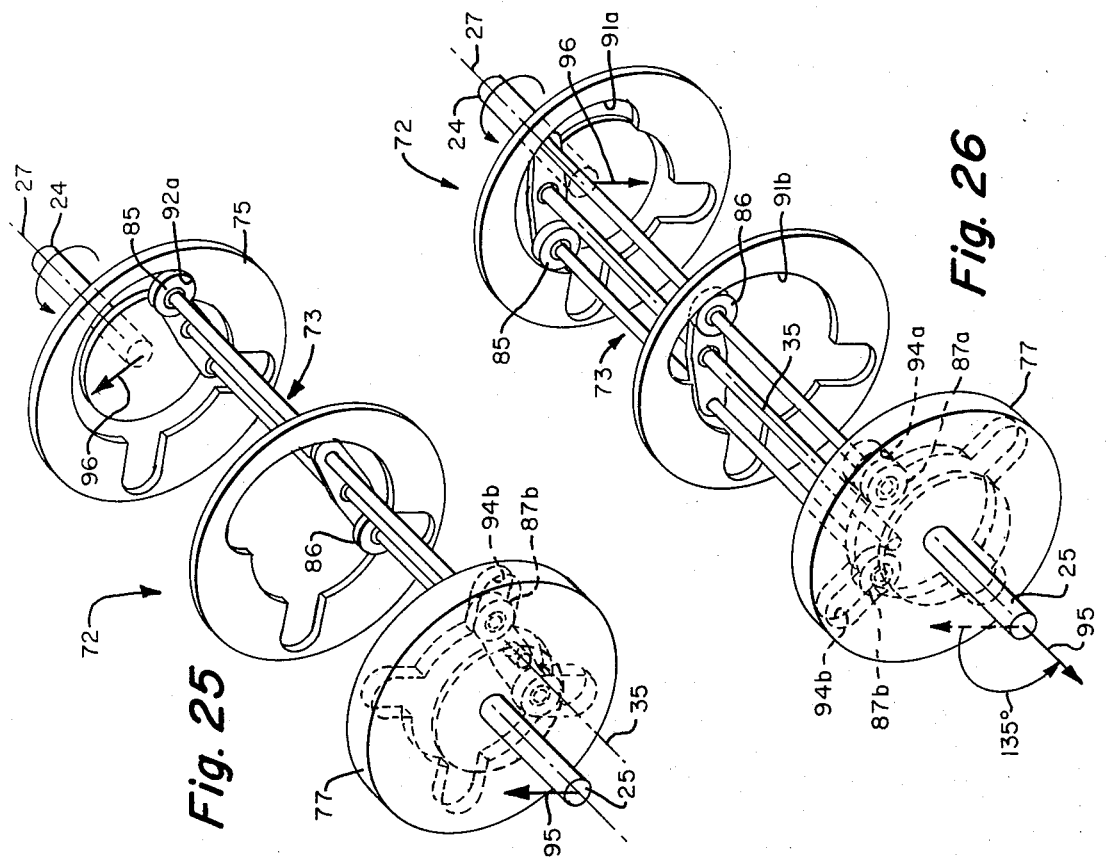

IN-LINE, POSITIVE DRIVE, INDEXING UNIT

CROSS-REFERENCES TO RELATED APPLICATIONS

This application is a continuation-in-part of copending application Ser. No. 224,753 filed Feb. 9, 1972 now abandoned.

BACKGROUND OF THE INVENTION

1. Field of the Invention

This invention relates to an indexing unit, and more particularly, to an indexing unit having coaxial input and output shafts connected by a positive drive train.

2. Description of the Prior Art

Indexing units have a wide variety of uses in practically all modern industries. Indexing units include an input shaft which is driven continuously at a constant angular velocity; and an output shaft which rotates intermittently. In prior art indexing units, each revolution of the input shaft consists of a "dwell period" during which the output shaft remains stationary; and an "indexing period" during which the output shaft rotates through a selected "indexing angle." Two basic types of mechanisms have been employed to convert the constant rotation of the input shaft into intermittent rotation of the output shaft.

The first mechanism type is the positive drive arrangement wherein, for example, the input shaft carries a cam wheel provided with one or more cam surfaces, and the output shaft, arranged at right angles to the input shaft, carries a second wheel provided with one or more cam followers or rollers.

Other positive drive arrangements are known wherein the input and output shafts are spaced-apart and parallel. These positive drive arrangements are modifications of the first-described type and incorporate, for example, a star wheel in place of the cam wheel. See for example U.S. Pat. No. 2,986,949. Still other more complicated positive drive arrangements are known for spaced-apart, parallel shafts, which incorporate numerous components in a variety of complex arrangements.

Still another positive drive arrangement, known as the planetary gear mechanisms, incorporates individually rotatable, coaxially-aligned input and output shafts, and non-circular output and planetary gears to produce intermittent output from a single continuous input. See John H. Bickford, "Mechanisms For Intermittent Motion" (New YOrk, N.Y.: Industrial Press, Inc., 1972), p. 145. In this arrangement, the output shaft rotates in a direction opposite to that of the input shaft. Moreover, the use of non-circular gears seriously restrict the choice of dwell period and indexing angle.

The second mechanism type may be termed an auxiliary drive arrangement which incorporates electromagnetic clutches and brake mechanisms to effect indexing. In one such arrangement, the input and output shafts are concentrally arranged, i.e., the output shaft extends through a central bore provided in the input shaft. The input shaft is driven continuously. An electromagnetic clutch, when activated, rotates the output shaft. A solenoid operated brake, when activated, stops the rotation of the output shaft. The second mechanism type requires two power sources, one for driving the input shaft and one for actuating the clutch and brake mechanisms.

SUMMARY OF THE INVENTION

The principal object of this invention is to provide an indexing unit having coaxial input and output shafts connected by a positive drive train.

Still another object of this invention is to provide indexing means which provides smooth acceleration and smooth deceleration of the output shaft during the initial and end portions of the indexing period.

Another object of this invention is to provide an indexing unit having dwell means and indexing means which provide the desired dwell period and indexing period.

A further object of this invention is to provide an in-line, positive drive, indexing unit wherein the input shaft can be driven clockwise or counterclockwise as required.

The present invention provides an in-line, positive drive, indexing unit comprising a housing having input and output shafts extending from the opposite housing ends. The input and output shafts are supported by journal means disposed within the housing, in coaxial alignment for individual rotation about a common first axis. A positive drive train is provided including planetary gear means and output gear means of constant pitch diameter. The planetary gear means is supported by the input shaft (a) for rotation about a second axis spaced from the common first axis, and (b) for revolution with the input shaft about the common first axis. The output gear means is secured to the output shaft in meshing relation with the planetary gear means. Dwell means distinct from the output gear means is provided which is operable during a selected arc segment of revolution of the input shaft for rendering the positive drive train inactive, whereby the output shaft remains stationary. Indexing means distinct from the output gear means is provided which is operable during the remaining arc segment of revolution of the input shaft for activating the positive drive train to rotate the output shaft through a selected indexing angle. The output shaft rotates in the same direction as the input shaft.

The dwell means causes rotation of the planetary gear means at a constant angular velocity about the second axis and in the direction of revolution about the common first axis. The planetary gear means rolls about the output gear means and the output shaft remains stationary. That is, no torque is transmitted by the positive drive train from the rotating input shaft to the output shaft.

The indexing means provides controlled deceleration of the planetary gear means from the aforesaid constant angular velocity during the initial portion of the indexing period; and controlled acceleration of the planetary gear means to the aforesaid constant angular velocity during the terminal portion of the indexing period. During that portion of the indexing period intermediate of the initial and terminal portions, the indexing means provides controlled action of the planetary gear means. The "action" of the planetary gear means includes (a) rotation in the direction of revolution about the common first axis but at an angular velocity other than the aforesaid constant angular velocity; (b) rotation at angular velocities including the aforesaid constant angular velocity but in a direction opposite to the direction of revolution about the common first axis; or (c) remaining stationary. The overall arrangement is such that during the initial, intermediate and terminal portions of the indexing period, the output shaft undergoes smooth acceleration, then rotation at a selected or varying angular velocity, and then smooth deceleration, respectively — the output shaft being rotated through a selected indexing angle.

BRIEF DESCRIPTION OF THE DRAWINGS

FIG. 1 is an isometric view of the present indexing unit;

FIGS. 2–5 are isometric views schematically illustrating the basic components and the operation of one embodiment of the present indexing unit;

FIG. 6 is a graph illustrating the relationship between the indexing and dwell of the output shaft and the rotation of the input shaft, of the embodiment illustrated in FIGS. 2–5;

FIG. 7 is an isometric view schematically illustrating an alternative arrangement of the indexing unit of FIGS. 2–5;

FIGS. 8 and 10 are isometric views schematically illustrating the basic components of further alternative embodiments of the present indexing unit;

FIGS. 9 and 11 are graphs illustrating the relationship between the indexing and dwell of the output shaft and the rotation of the input shaft, of the alternative embodiments illustrated in FIGS. 8 and 10, respectively;

FIG. 12 is a graph illustrating the relationship of the indexing and dwell of the output shaft and the rotation of the input shaft, of the alternative embodiments illustrated in FIGS. 13–18;

FIGS. 13–18 are isometric views schematically illustrating the basic components and the operation of an alternative embodiment of the present indexing unit;

FIGS. 19–21 are isometric views schematically illustrating further alternative embodiments of the present indexing unit;

FIG. 22 is an isometric view illustrating a planet wheel component of a still further alternative embodiment of the present indexing unit;

FIG. 23 is an isometric view illustrating stationary plates and output wheel components which cooperate with the planet wheel component of FIG. 22; and FIGS. 24–28 are isometric views schematically illustrating the operation of the embodiment of the present indexing unit assembled from the components of FIGS. 22 and 23.

DESCRIPTION OF THE PREFERRED EMBODIMENTS

The present indexing unit 20 (FIG. 1) comprises a housing 21 having an input shaft 24 extending from one housing end 22 and an output shaft 25 extending from the opposite housing end 23. The input and output shafts 24, 25 are supported by journal means schematically illustrated at 26 (FIG. 2), for individual rotation about a common first axis 27. Drive means schematically illustrated at 32 (FIG. 1) is provided for rotating the input shaft 24 at a selected angular velocity.

Referring to FIG. 2, the shafts 24, 25 are connected by a positive drive train 28 including planetary gear means 29 and output gear means 30. The planetary gear means 29 comprises a planetary spur gear 31 carried by a shaft 33 which is journaled to the end of a radial arm 34 for rotation about a second axis 35—the longitudinal axis of the shaft 33. The arm 34 is secured to the input shaft 24. The overall arrangement is such that the planetary gear means 29 is supported by the input shaft 24 for rotation about the second axis 35 which is spaced from the common first axis 27; and for revolution with the input shaft 24 about the common first axis 27.

The output gear means 30 comprises an output spur gear of constant pitch diameter secured to the output shaft 25 and disposed in meshing relation with the planetary spur gear 31. The positive drive train 28 substantially elminates backlash, play and vibrations from the present indexing unit 20.

The indexing unit 20 (FIG. 2) also is provided with dwell means 36 for maintaining the output shaft 25 stationary during a first selected arc segment of revolution of the input shaft 24; and indexing means 37 for rotating the output shaft 25 through a selected indexing angle during a second selected arc segment of revolution of the input shaft 24.

The first and second selected arc segments of revolution of the input shaft 24 are commonly known in the art as the "dwell period" and the "indexing period." In This embodiment, the "dwell period" and the "indexing period" are each equal to 180 angular degrees. In the embodiment of the present indexing unit 20 of FIGS. 2–5, the output shaft 25 remains stationary during the "dwell period" and is rotated through 180 angular degrees during the "indexing period." The indexing unit 20 is commonly known as a two-stop indexing unit.

The dwell means 36 comprises a second planetary spur gear 38 secured to the shaft 33, and stationary gear means or a sun gear segment 39 which is concentric with the common first axis 27. The second planetary spur gear 38 meshes with the sun gear segment 39 during the first selected arc segment of revolution of the input shaft 24. The sun gear segment 39 is secured to the interior of the housing 21 (FIG. 1) and presents gear teeth schematically illustrated by the solid line 40 along an arc segment thereof which is equal to the first selected arc segment of revolution of the input shaft 24. In this instance, the gear teeth 40 are presented along an arc segment of 180 angular degrees.

The indexing means 37 comprises a cam track 41 secured to the interior of the housing 21 (FIG. 1); and a cam follower 42 which is secured to the second planetary spur gear 38, for example, by a pin schematically illustrated at 43, at a selected radial distance from the second axis 35. The cam follower 42 engages and is guided by the cam track 41 during the second selected arc segment or "indexing period" of the input shaft 24. The cam track 41 has opposite open ends 44, 45, and an arcuate length equivalent of the "indexing period" of the input shaft 24. For counterclockwise rotation of the input shaft 24, the cam follower 42 enters the cam track 41 through the open end 44 (FIG. 2) and leaves the cam track 41 through the open end 45 (FIG. 4). For clockwise rotation (not illustrated) of the input shaft 24, the cam follower 42 enters and leaves the cam track 41 through the open ends 45, 44, respectively.

The operation of the indexing unit 20 will now be described with reference to FIGS. 2–5 and the graph of FIG. 6. In the following description, it will be assumed that the input shaft 24 is rotated counterclockwise.

In the instant in time represented by FIG. 2, the planetary spur gears 31, 38 are in their uppermost position relative to the output gear means 30 and the stationary sun gear segment 39. The second planetary spur gear 38 is about to be disengaged from the stationary sun gear gear segment 39. The cam follower 42 has entered the cam track 41 through the open end 44. An arrow 46, disposed in a vertically upward orientation in FIG. 2, is provided on the output gear means 30 for the purpose of illustration. The instant in time represented by FIG. 2 is also represented in the graph of FIG. 6 at those ordinates labeled FIG. 2.

While the input shaft 24 is rotated counterclockwise through 90 angular degrees (FIG. 3) to 180 angular degrees (FIG. 4), the cam follower 42 is guided by the cam track 41 in such a way that rotation of the planetary spur gear 31 in the direction of revolution about the common first axis 27 is prevented. Since the planetary spur gear 31 is retained in meshing relation with the output gear means 30 and since it is prevented from rotating, torque is transmitted from the input shaft 24 to the output shaft 25 and the output shaft 25 is rotated counterclockwise through a selected indexing angle, which in this instance, is equal to 180 angular degrees. Thus, it can be stated that the indexing means 37 is operable during the second selected arc segment of revolution (indexing period) of the input shaft 24 for preventing rotation of the planetary gear means 31 in the direction of revolution about the common first axis 27, whereby torque is transmitted from the input shaft 24 to the output shaft 25 and the output shaft 25 is rotated through a selected indexing angle.

It will be observed in FIG. 4 that the second planetary spur gear 38 is now positioned for meshing engagement with the stationary sun gear segment 39 and that the cam follower 42 is positioned to leave the cam track 41 by way of the open end 45. Now, as the input shaft 24 is rotated counterclockwise from the 180 degree position of FIG. 4, through the 270 degree position of FIG. 5 to the 360 degree position of FIG. 2, the planetary spur gear 38, meshing with the stationary sun gear segment 39, causes the planetary spur gear 31 to roll about the output gear means 30. It should be noted that the output gear means 30 and the stationary sun gear segment 39 have identical pitch diameters; and that the planetary spur gears 31, 38 also have identical pitch diameters. Thus, as the planetary spur gears 31, 38 are revolved about the common first axis 27 by the input shaft 24, the planetary spur gears 31, 38 roll about the output gear means 30 and stationary sun gear segment 39, respectively. Hence, no torque is transmitted from the input shaft 24 to the output shaft 25 and the output shaft 25 remains stationary.

Thus, it can be stated that the dwell means 36 is operable during a first selected arc segment of revolution or the "dwell period" of the input shaft 24 for rotating the planetary gear means 39 rolls about the second axis 35 and in the direction of revolution about the common first axis 27, whereby the planetary gear means 31 about the output gear means 30 and the output gear means 30 remains stationary.

In FIG. 6, the "FIGURE" numerals about the ordinates correspond to FIGS. 2–5. It will be appreciated by a study of FIG. 6, that as the input shaft rotates through 180 angular degrees, the output shaft is rotated through an indexing angle of 180°. As the input shaft completes its revolution (180°–360°), the output shaft remains stationary or dwells. Thus, in the indexing unit illustrated in FIGS. 2–5, the output shaft is rotated through ½ revolution for each complete revolution of the input shaft. Such an indexing unit is commonly known as a two-stop indexing unit.

FIG. 7 illustrates an alternative arrangement of an indexing unit 20A. Corresponding numerals are employed to identify corresponding parts heretofore described. In this arrangement, the stationary sun gear segment 39 is positioned forwardly of the output gear means 30. A common planetary spur gear 47 is supported by the shaft 33 in meshing relation with the output gear means 30. The common planetary spur gear 47 is also positioned for meshing engagement with the stationary sun gear segment 39. A second radial arm 48 secured to the shaft 33 supports the cam follower 42 at the selected radial distance from the second axis 35. The operation of the indexing unit 20A of FIG. 7 is identical to that of the indexing unit 20 (FIGS. 2–5).

Further alternative embodiments of the present indexing unit and their operation are illustrated in FIGS. 8–11.

FIG. 8 illustrates an indexing unit 20B wherein during the indexing period of the input shaft 24, the output shaft 25 is rotated through an indexing angle of 90° (FIG. 9). In this embodiment, the dwell means 36C is provided with a stationary sun gear segment 39B presenting gear teeth 40B along an arc segment 49 equal to 270 angular degrees. The indexing means 37B includes a cam track 41B having an arc length of 90 angular degrees. The operation of the indexing unit 20B is illustrated in FIG. 9. As the input shaft rotates through 90 angular degrees (indexing period), the output shaft is rotated through an indexing angle of 90°. As the input shaft 24 completes one revolution (90 angular degress to 360 angular degrees), the output shaft 25 remains stationary or dwells.

FIG. 10 illustrates an indexing unit 20C wherein during the indexing period of the input shaft 24, the output shaft 25 is rotated through an indexing angle equal to 270 angular degrees. In this embodiment, the dwell means 36C includes a stationary sun gear segment 39C which presents gear teeth 40C along an arc segment 50 equal to 90 angular degrees. The indexing means 37C includes a cam track 41C having an arc length of 270 angular degrees. The operation of the indexing unit 20C is graphically illustrated in FIG. 11. As the input shaft rotates through 270 angular degrees (indexing period), the output shaft is rotated through an indexing angle of 270 angular degrees. As the input shaft completes one revolution (270 angular degrees to 360 angular degrees), the output shaft remains stationary or dwells.

The indexing unit 20 of FIGS. 2–5, is a two-stop indexing unit wherein the output shaft rotates through an indexing angle of 180 angular degrees for each revolution of the input shaft. The indexing unit 20B of FIG. 8 is a four-stop indexing unit wherein the output shaft rotates through an indexing angle of 90 angular degrees for each revolution of the input shaft. The indexing unit 20C of FIG. 10 is a 1¼ stop indexing unit wherein the output shaft rotates through 270 angular degrees for each complete revolution of the input shaft. Thus, in accordance with the present invention, indexing units of any desired number of stops can be provided by incorporating a stationary sun gear segment 39 and a cam track 41 of appropriate arc lengths. For example, a six-stop indexing unit will result when the cam track 41 has an arc length of 60 angular degrees and the sun gear segment 39 has an arc segment of 300 angular degrees.

It will be observed in FIGS. 3, 7, 8, and 10 that the cam tracks 41 present lead-in and lead-out end segments 51, 52. As the planetary spur gears 31, 38 revolve aabout the common first axis 27 beyond that position illustrated in FIG. 2, the lead-in can track end segment 51 (FIG. 3), when engaged by the cam follower 42, causes the planetary spur gears 31, 38 to decelerate smoothly which, in turn, causes the output gear means 30 to accelerate smoothly. At the end of the indexing period of the input shaft 24, the lead-out cam track end segment 52 (FIG. 3), when engaged by the cam follower 42, causes the planetary spur gears 31, 38 to accelerate smoothly which, in turn, causes the output gear means to decelerate smoothly. When the planetary spur gears 31, 38 arrive at the position illustrated in FIG. 4, the planetary spur gears 31, 38 have been accelerated to the constant angular velocity they are to rotate about the second axis 35 during the dwell period of input shaft 24.

To accomplish the described "dwell period" it is important that the output gear means 30 and the sun gear segment 39 have indentical pitch diameters, and that the planetary spur gears 31, 38 have identical pitch diameters. It is also important to note that as the planetary spur gears 31, 38 approach the FIG. 2 position, the cam follower 42 must be positioned for introduction into the cam track end 44. That positioning of the cam follower 42 is accomplished by selection of the pitch diameter of the planetary spur gears 31, 38.

A further alternative embodiment of the present indexing unit is schematically illustrated in FIGS. 13–18 and is identified generally by the numeral 53. The operation of the indexing unit 53 is graphically illustrated in FIG. 12. Corresponding numerals will be employed to identify corresponding parts heretofore described.

In FIG. 12, the "FIGURE" numerals above the ordinates correspond to FIGS. 13–18. It will be observed in FIG. 12 that the input shaft has an indexing period of 180 angular degrees and a dwell period of 180 angular degrees. However during the indexing period—½ revolution of the input shaft—the output shaft is rotated through an indexing angle of 360 angular degrees. The output shaft remains stationary or dwells during the dwell period—second half of revolution of the input shaft.

Referring to FIG. 13, the indexing unit 53 is similar, in many respects, to the indexing unit 20. However, the indexing unit 53 incorporates a modified indexing means 54 including a second stationary gear means in the form of a ring gear 55 having internal gear teeth 56 presented along an arc segment represented by the dimension line 57 which is equal to 90 angular degrees. The stationary ring gear 55 is concentric with the sun gear segment 39 about the common first axis 27. The modified indexing means 54 additionally includes spaced-apart cam tracks 58, 59 positioned to receive and guide the cam follower 42. The cam track 58 includes the lead-in cam track end segment 51 and a lead-out cam track end segment 60. The cam track 59 (FIG. 16) includes a lead-in cam track end segment 62 and the lead-out cam track segment 52.

The operation of the indexing unit 54 will now be described with reference to FIGS. 13–18, inclusive. As the planetary spur gears 31, 38 revolve about the common first axis 27 from the position illustrated in FIG. 13 to the position illustrated in FIG. 14, the cam follower 42 passes sequentially through the cam track segments 51, 60. As the cam follower proceeds through the lead-in cam track end segment 51, the counterclockwise rotation of the planetary spur gears 31 is decelerated smoothly causing a smooth acceleration of the output gear means 30. When the cam follower 42 reaches that position illustrated in dotted line in FIG. 14 and which is midway through the cam track segment 58, the direction of rotation of the planetary spur gears 31, 38 is reversed. Thus, as the cam follower 42 continues through the lead-out cam track end segment 60 (FIG. 13), the planetary spur gears 31, 38 are rotated clockwise and accelerated smoothly to a peak clockwise angular velocity. Thus, when the second planetary spur gear 38 reaches the position illustrated in FIG. 14, it is now positioned for meshing relation with the gear teeth 56 of the ring gear 55 and is being rotated clockwise at the required angular velocity. Note that the output geam means 30 has been rotated through approximately 45 angular degrees.

FIG. 15 illustrates the second planetary spur gear 38 midway through its travel along the ring gear teeth 56. The output gear means 30 has now been rotated through 135°, or a total of 180 angular degrees from the position of FIG. 13.

When the second planetary spur gear 38 arrives at the end of the ring gear teeth 56 (FIG. 16), the cam follower 42 enters the cam track segment 59. Note that in arriving at the position illustrated in FIG. 16, the output gear means 30 has rotated through an additional 135 angular degrees—the output shaft having been rotated through a total of 315 angular degrees. It will be observed by comparing FIGS. 14–16, that the planetary spur gears 31, 38 revolve about the common first axis through 90 angular degrees. However, the combination of revolution of the planetary spur gears 31, 38 about the common first axis 27 and forced clockwise rotation of the planetary spur gears 31, 38 by the ring gear teeth 56, causes the output shaft 25 to be rotated through 270 angular degrees.

As the planetary gears 31, 38 continue to revolve about the common first axis 27 from the position illustrated in FIG. 16 to the position illustrated in FIG. 17, the cam follower 42 is received in and guided by the cam track 59. The lead-in cam track end segment 62 causes smooth deceleration in the clockwise rotation of the planetary spur gears 31, 38. When the cam follower 42 reaches the lead-out cam track end segment 52, the rotation of the planetary spur gears 31, 38 is reversed so that they begin to rotate counterclockwise. As the cam follower 42 proceeds through the lead-out cam track end segment 52, the planetary spur gears 31, 38 are accelerated smoothly and attain a peak counterclockwise angular velocity. The planetary spur gear 38 (FIG. 17), now meshes with the gear teeth 40 of the stationary sun gear segment 39. It will be observed by comparing FIGS. 16 and 17 that the output shaft 25 has been rotated an additional 45 angular degrees—the output shaft 25 now being rotated a total of 360 angular degrees.

As the planetary spur gears 31, 38 revolve about the common first axis 27 from the position illustrated in FIG. 17, through the midway position illustrated in FIG. 18 to the initial position illustrated in FIG. 13, the planetary spur gear 38 is rotated counterclockwise by the gear teeth 40 of the stationary sun gear segment 39. Hence, the planetary spur gear 31 rolls around the output gear means 30 and the output shaft 25 remains stationary.

In the indexing units 20, 20A, 20B and 20C, the output gear means 30 and the dwell means 36 are provided in the form of a spur gear or sun gear. FIGS. 19–21 illustrate indexing units 63, 64 and 65 wherein the output gear means 30 comprises a ring gear 66 presenting internal gear teeth 67. The ring gear 66 is secured to the output shaft 25 in meshing relation with the planetary spur gear 31. The dwell means 36 comprises stationary ring gears 68, 69 and 70 disposed in meshing relation with the planetary spur gear 38. It will be observed in FIGS. 19–21 that the stationary ring gears 68, 69 and 70 present internal gear teeth 71 along arc segments equal to 180, 270 and 90 angular degrees, respectively. The operation of the indexing units 63, 64 and 65 is identical to the operation of the indexing units 20 (FIG. 2–5), 20B (FIG. 8) and 20C (FIG. 10), respectively.

A further alternative embodiment of the present indexing unit, designated generally by the numberal 72, is illustrated in FIGS. 22–28. The basic components include a planet wheel 73 rotatably supported by a carrier 74 (FIG. 22); and first and second stationary plates 75, 76 and an output wheel 77 (FIG. 23).

Referring to FIG. 22, the planet wheel 73 is rotatable about the aforesaid second axis 35 which corresponds with the longitudinal axis of a central shaft 78. The shaft 78 has opposite ends affixed to end plates 79a, 79b of the carrier 74. The carrier 74 is supported for rotation about the aforesaid common first axis 27 by journal means (not illustrated) carried by the input shaft 24 and an input shaft extension 24a. The planet wheel 73 may comprise arms 80, 81, 82 rotatably supported by the central shaft 78; and rods 83, 84 connecting the corresponding ends of the arms 80, 81, 82, whereby the arms 80–82 and the rods 83, 84 rotate as a unit about the second axis 35. A first conjugate pair of followers 85, 86 is provided wherein the followers 85, 86 are rotatably supported on the rods 83, 84, respectively, adjacent to the arms 80, 81. At least two rollers, such as a second conjugate pair of output rollers 87a, 87b is provided wherein the rollers 87a, 87b are rotatably supported on the rods 84, 83, respectively, adjacent to the arm 82. The end plates 79a, 79b are maintained in fixed orientation relative to each other by a connecting member 74a.

Referring to FIG. 23, the stationary plate 75 is provided with a central opening 88a, whose periphery includes control slots 89a, 90a and a first cam surface 91a including an end control slot 92a. The control slots 89a, 90a and 92a are spaced apart by 90 angular degrees, and the first cam surface 91a extends along 180 angular degrees. The stationary plate 76 is identical to the stationary plate 75, and inclues a central opening 88b, control slots 89b, 90b 92b and a second cam surface 91b. However, it will be observed in FIG. 23 that the second stationary plate 76 is a mirror image of the stationary plate 75, i.e., the control slot 89b is coincident with the control slot 90a, and the control slot 90b is coincident with the control slot 89a. The second cam surface 91b has a configuration which is the reverse of that of the first cam surface 91a, and which lags or leads, depending on the direction of rotation of the input shaft 24, the first cam surface 91a by 90 angular degrees. The first and second cam surfaces 91a, 91b are commonly known as conjugate cams.

The output wheel 77 has a central depression 93 whose periphery includes output slots 94 which are spaced at 90 angular degree intervals. The output wheel 77 carries the output shaft 25 and is supported by journal means (not illustrated) for rotation about the common first axis 27.

The operation of the indexing unit 72 will now be described with reference to FIGS. 24–28. For clarity, the connecting member 74A of the carrier 74 is not illustrated in FIGS. 24–28. In the following description, it will be assumed that the input shaft 24 is rotated counterclockwise. Arrows 95, 96, disposed in a vertically upward position are provided on the output shaft 25 and the end plate 79a, respectively, and will be employed to illustrate the relative position of the input and output shafts 24, 25 during one complete revolution of the input shaft 24.

At the instant in time represented by FIG. 24, the follower 86 is engaged with the control slot 89b of the second stationary plate 76. Also, the output roller 87 is engaged in the control slot 94a of the output wheel 77.

While the input shaft 24 is rotated counterclockwise through 45 angular degrees (compare the arrow 96 positions in FIGS. 24 and 25), the follower 86 and the output roller 87a remain engaged with the control slots 89b and 94a, thereby causing the planet wheel 73 to rotate clockwise through 45 angular degrees. At the instant in time represented by FIG. 25, the output roller 87b and the follower 85 engage the control slots 94b and 92a of the output wheel 77 and the first stationary plate 75. Since the planet wheel 73 is rotated about the second axis 35, no torque is transmitted to the output wheel 77 and the output wheel 77 remains stationary.

As the input shaft 24 is rotated counterclockwise through the next 135 angular degrees (compare the arrow 96 positions in FIGS. 25 and 26), the followers 85, 86 ride over the first and second cam surfaces 91a, 91b whereby the rotation of the planet wheel 73 is controlled. The controlled rotation of the planet wheel 73 causes torque to be transmitted to the output wheel 77, whereby the output wheel 77 is rotated counterclockwise through 135 angular degrees—compare the arrow 95 positions in FIGS. 25 and 26.

As the input shaft 24 is rotated counterclockwise through the next 45 angular degrees (compare the arrow 96 positions of FIGS. 26 and 27), the rotation of the planet wheel 73 is still controlled by engagement of the followers 85, 86 with the cam surfaces 91a, 91b. Consequently, the output rollers 87a, 87b being engaged with the output slots 94a, 94b causes the output wheel 77 to rotate counterclockwise through 45 angular degrees—compare the arrow 95 psotiions in FIGS. 26 and 27.

At the instant in time represented by FIG. 27, the follower 85 enters the control slot 89a of the first stationary plate 75. The follower 86 engages the end control slot 92b of the cam surface 91b, thereby causing the planet wheel 73 to rotate clockwise as the input shaft 24 rotates through the next 45 angular degrees—compare the arrow 96 positions and the planet wheel 73 position in FIGS. 27 and 28.

At the instant in time represented by FIG. 28, the follower 85 emerges from the control slot 89a as the follower 86 enters the control slot 89b. Rotation of the input shaft through the next 45 angular degrees (compare the arrow 96 positions of FIGS. 28 and 24) causes the planet wheel 73 to rotate clockwise through 45 angular degrees.

From the foregoing description it will be appreciated that the indexing unit 72 of FIGS. 22 to 28, is a two-stop indexing unit wherein the output shaft 25 rotates through an indexing angle of 180 angular degrees for each revolution of the input shaft 24 and in the same direction of revolution as the input shaft 24. As in the other embodiments, the indexing unit 72 includes the aforesaid positive drive train, dwell means and indexing means, as will now be identified.

The positive drive train comprises the conjugate pair of output rollers 87a, 87b and the output wheel 77. It will be appreciated that the output rollers 87a, 87b may be described as a planetary spur gear having two diametrically opposite teeth. Similarly, the output wheel 77 may be described as a ring gear having four teeth defined by the output slots 94. Consequently, the conjugate pair of output rollers 87a, 87b and the output wheel 77 are the functional equivalents of the spur gear 31 and the ring gear 66 of the indexing unit 63 of FIG. 19.

The dwell means comprises the conjugate pair of followers 85, 86 and the control slots 89a, 90a and 89b, 90b of the first and second stationary plates 75, 76. It will be appreciated that the conjugate pair of followers 85, 86 may be described as a gear having two diametrically opposite teeth. Also, the stationary plates 75, 76 may be described as ring gears having two teeth defined by the control slots 89, 90 and end valley 92. Consequently, the followers 85, 86 and the teeth (control slots 89, 90 and 92) of the stationary plates 75, 76 are the functional equivalents of the spur gear 38 and the ring gear 68 of the indexing unit 63 of FIG. 19.

The indexing means comprises the conjugate pair of followers 85, 86 and the cam surfaces 91a, 91b of the first and second stationary plates 75, 76. The followers 85, 86 and the cam surfaces 81a, 91b are the functional equivalents of the cam follower 42 and the cam track 41 of, for example, the indexing unit 63 of FIG. 19. The cam surfaces 91a, 91b transmit, by way of the conjugate pair of followers 85, 86, a programmed displacement to rotation of the output wheel 77. The programmed displacement provides controlled acceleration and deceleration of the output shaft 25 during the indexing period, whereby abrupt changes in output motion are eliminated. The conjugate pair relationship of the followers 85, 86 maximizes the torque which can be transmitted to the output wheel 77; and eliminates roller crossover at the point where acceleration reverses to deceleration.

It will be appreciated that in the arrangement illustrated in FIGS. 22 to 28, the arc length of the cam surfaces 91a, 91b and the number of control slots 89, 90 may be varied to provide indexing units having other indexing periods and dwell periods.

I claim as my invention:

1. An indexing unit comprising:
   I. coaxially aligned input and output shafts supported for individual rotation about a common first axis;

II. a positive drive train connecting said input shaft to said output shaft, said positive drive train comprising:
      A. planetary gear means supported by said input shaft (a) for rotation about a second axis spaced from said common first axis, and (b) for revolution about said common first axis; and
      B. output gear means secured to said output shaft and disposed in meshing relation with said planetary gear means for rotating said output shaft;
   III. dwell means operable during a first selected arc segment of revolution of said input shaft for rendering said positive drive train inactive whereby said output shaft remains stationary; and
   IV. indexing means operable during a second selected arc segment of revolution of said input shaft for activating said positive drive train to rotate said output shaft through a selected indexing angle and in the same direction of rotation as said input shaft.

2. The indexing unit defined in claim 1 wherein said dwell means comprises:
   stationary gear means concentric with said common first axis, for rotating said planetary gear means only during said first selected arc segment of revolution of said input shaft, about said second axis and in the direction of revolution about said common first axis.

3. The indexing unit defined in claim 2 wherein said stationary gear means comprises:
   a stationary sun gear presenting gear teeth along an arc segment thereof equal to said first selected arc segment of revolution of said input shaft; and
   said output gear means comprises a spur gear.

4. The indexing unit defined in claim 2 wherein
   said stationary gear means comprises a stationary ring gear presenting gear teeth along an arc segment thereof equal to said first selected arc segment of revolution of said input shaft; and
   said output gear means comprises a ring gear.

5. The indexing unit defined in claim 2 wherein said planetary gear means comprises separate coaxial planetary spur gears, one meshing with said output gear means and one positioned for meshing engagement with stationary gear means.

6. The indexing unit defined in claim 2 wherein said planetary gear means comprises:
   a planetary spur gear meshing with said output gear means and said stationary gear means.

7. The indexing unit defined in claim 2 wherein said output gear means and said stationary gear means have identical pitch diameters.

8. The indexing unit defined in claim 1 wherein said indexing means comprises:
   a cam follower radially spaced from said second axis and rotatable with said planetary gear means; and cam track means engageable by said cam follower for preventing rotation of said planetary gear means about said second axis, in the direction of revolution about said common first axis.

9. The indexing unit defined in claim 8 wherein said cam track means is arranged about said common first axis and has an arcuate length equivalent of said indexing period of said input shaft.

10. The indexing unit defined in claim 1 wherein said indexing means comprising:
    a stationary ring gear segment having leading and trailing ends, said stationary ring gear segment being positioned for meshing engagement with said planetary gear means thereby to rotate said planetary gear means at a selected angular velocity about said second axis in a direction opposite to its direction of revolution about said common first axis;

a cam follower radially spaced from said second axis and rotatable with said planetary gear means;

first cam track means adjacent to said leading end of said ring gear means for receiving said cam follower and for accelerating said planetary gear means to said selected angular velocity; and second cam track means adjacent to said trailing end of said ring gear means for receiving said cam follower and for decelerating said planetary gear means.

11. The indexing unit defined in claim 1 wherein said output gear means has a constant pitch diameter.

12. The indexing unit defined in claim 1 wherein said dwell means is distinct from said output gear means.

13. The indexing unit defined in claim 1 wherein said indexing means is distinct from said output gear means.

14. The indexing unit defined in claim 1 wherein said planetary gear means comprises at least two rollers, said rollers being spaced from and supported for revolution about said second axis; and said output gear means comprises a member presenting radially extending output slots positioned for sequential engagement by said rollers.

15. The indexing unit defined in claim 1 including, a conjugate pair of rollers connected to said planetary gear means, said rollers being spaced from and supported for revolution about said second axis;

stationary plate means having axially spaced-apart central openings through which said common first axis extends; and wherein said dwell means comprises radially extending control slots positioned along first peripheral segments of said central openings for sequential engagement by the rollers of said conjugate pair; and said indexing means comprises axially spaced-apart cam surfaces provided along second peripheral segments of said central openings and engageable by the rollers of said conjugate pair.

16. An indexing unit comprising:

coaxially aligned input and output shafts supported for individual rotation about a common first axis;

planetary gear means supported by said input shaft (a) for rotation about a second axis spaced from said common first axis, and (b) for revolution about said common first axis;

output gear means secured to said output shaft in meshing relation with said planetary gear means for rotating said output shaft;

* * * * *

UNITED STATES PATENT OFFICE
CERTIFICATE OF CORRECTION

Patent No. 3,820,411  Dated June 28, 1974

Inventor(s) Rome R. Rudolph

It is certified that error appears in the above-identified patent and that said Letters Patent are hereby corrected as shown below:

Claim 16, line 26, after the semicolon, add the following:

dwell means operable during a dwell period of said input shaft for rotating said planetary gear means at a constant angular velocity about said second axis and in the direction of revolution about said common first axis, whereby said planetary gear means rolls about said output gear means and said output shaft remains stationary; and indexing means operable during an indexing period of said input shaft providing controlled rotation of said planetary gear means about said second axis and thereby transmitting torque from said input shaft to said output shaft to rotate said output shaft through a selected indexing angle and in the same direction of rotation as said input shaft.

Signed and sealed this 26th day of November 1974.

(SEAL)
Attest:

McCOY M. GIBSON JR.
Attesting Officer

C. MARSHALL DANN
Commissioner of Patents